(12) United States Patent
Ooi et al.

(10) Patent No.: US 7,576,939 B2
(45) Date of Patent: Aug. 18, 2009

(54) DISCONTINUOUS MODE BACK EMF MEASUREMENT

(75) Inventors: KianKeong Ooi, Singapore (SG); KeXiu Liu, Newcastle (AU); Shuyu Cao, Singapore (SG); MingZhong Ding, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/940,521

(22) Filed: Nov. 15, 2007

(65) Prior Publication Data

US 2009/0128946 A1 May 21, 2009

(51) Int. Cl.
*G11B 21/02* (2006.01)
(52) U.S. Cl. .................. 360/75; 360/78.04; 318/494
(58) Field of Classification Search .................. None
See application file for complete search history.

(56) References Cited

U.S. PATENT DOCUMENTS

| | | | |
|---|---|---|---|
| 6,081,112 A | 6/2000 | Carobolante et al. | |
| 6,363,214 B1 * | 3/2002 | Merello et al. | 318/109 |
| 6,392,375 B1 * | 5/2002 | Portaluri et al. | 318/459 |
| 6,463,211 B1 | 10/2002 | Peritore et al. | |
| 6,600,618 B2 | 7/2003 | Schlager | |
| 6,917,486 B2 | 7/2005 | Tanner | |
| 7,005,820 B2 * | 2/2006 | Tanner | 318/471 |
| 7,009,806 B2 | 3/2006 | Zayas et al. | |
| 7,079,350 B1 | 7/2006 | Vertemara et al. | |
| 7,082,009 B2 | 7/2006 | Zayas et al. | |
| 7,215,094 B2 | 5/2007 | Maiocchi et al. | |
| 2004/0257692 A1 * | 12/2004 | Ehrlich | 360/77.02 |
| 2005/0157418 A1 | 7/2005 | Galbiati | |
| 2006/0066981 A1 | 3/2006 | Brenden et al. | |
| 2006/0072238 A1 * | 4/2006 | Hensen | 360/78.06 |

* cited by examiner

*Primary Examiner*—Jason C Olson
(74) *Attorney, Agent, or Firm*—David K. Lucente

(57) ABSTRACT

A terminal voltage of an actuator motor is measured while the actuator motor is in a high impedance state. An internal voltage of the actuator motor is measured, and a back-EMF voltage of the actuator motor is estimated in response to the terminal voltage of the actuator motor and the internal voltage of the actuator motor. A drive current supplied to the actuator motor is controlled in response to the estimated back-EMF.

17 Claims, 7 Drawing Sheets

DISCONTINUOUS MODE BACK EMF MEASUREMENT

BACKGROUND

The present invention generally relates to systems with voice coil motors and, more particularly, to controlling velocity of a transducer using Back-EMF measurements of an actuator motor.

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks.

The disk is rotated by a spindle motor at a high speed, allowing the transducer to access different sectors within each track on the disk. The actuator arm is coupled to a motor or coarse actuator, such as a voice coil motor (VCM), to move the actuator arm such that the transducer moves radially over the disk. Operation of the actuator is controlled by a servo control system. The servo control system generally performs two distinct functions: seek control and track following. The seek control function includes controllably moving the actuator arm such that the transducer is moved from an initial position to a target track position.

In general, the seek function is initiated when a host computer associated with the disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The transducer rides above the surface of the disk on an air bearing generated by the rotational motion of the disk. It is not desirable for the transducer to contact the disk surface, as such contact can damage the transducer and/or result in loss of data on the disk. Accordingly, when the disk drive is not being used to read/write data to/from the disk, it is desirable to "park" the transducer, i.e., move the transducer to a location so that it is not over a track that is used to store data. In some disk drives, the head is parked by causing the actuator arm to traverse a ramp, which pushes the transducer away from the surface of the disk. This processes is referred to herein as a disk ramp unload process. When the actuator arm reaches the top of the ramp, the arm is latched into a storage position, so that the transducer will not collide with the disk surface if the disk drive is bumped or vibrated.

In order to read/write data to/from the disk, the transducer is unparked by releasing the actuator arm from the latch. A current signal to the voice coil motor causes the actuator arm to move down the ramp towards the disk, in a process referred to herein as a disk ramp load process. When the transducer reaches the end of the ramp, it is desirable for the transducer to be moving with the correct speed in order to maintain the transducer in proximity to the disk surface without causing a collision between the transducer and the disk surface. Therefore, it is desirable to monitor and control the speed of the transducer as it approaches the end of the ramp.

SUMMARY

A terminal voltage of an actuator motor is measured while the actuator motor is in a high impedance state. An internal voltage of the actuator motor is measured, and a back-EMF voltage of the actuator motor is estimated in response to the terminal voltage of the actuator motor and the internal voltage of the actuator motor. A drive current supplied to the actuator motor is controlled in response to the estimated back-EMF.

Some embodiments include measuring a terminal voltage of an actuator motor while the actuator motor is in a high impedance state, estimating an internal voltage of the actuator motor, estimating a back-EM voltage of the actuator motor in response to the terminal voltage of the actuator motor and the internal voltage of the actuator motor, and controlling a drive current supplied to the actuator motor in response to the estimated back-EMF.

An apparatus according to some embodiments includes a driver circuit that switches an actuator motor to a high impedance state, a sample and hold circuit that is coupled to terminals of the actuator motor and that measures a terminal voltage of the actuator motor while the actuator motor is in the high impedance state, and a control circuit that receives the measured terminal voltage of the actuator motor from the sample and hold circuit, estimates an internal voltage of the actuator motor, estimates a back-EMF voltage of the actuator motor in response to the terminal voltage of the actuator motor and the internal voltage of the actuator motor, and controls a drive current supplied to the actuator motor in response to the estimated back-EMF.

A control circuit according to some embodiments receives a measured terminal voltage of a actuator motor while the actuator motor is in a high impedance state, estimates an internal voltage of the actuator motor, estimates a back-EMF voltage of the actuator motor in response to the terminal voltage of the actuator motor and the internal voltage of the actuator motor, and controls a drive current supplied to the actuator motor in response to the estimated back-EMF.

DETAILED DESCRIPTION

The present invention now will be described more fully hereinafter with reference to the accompanying drawings, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
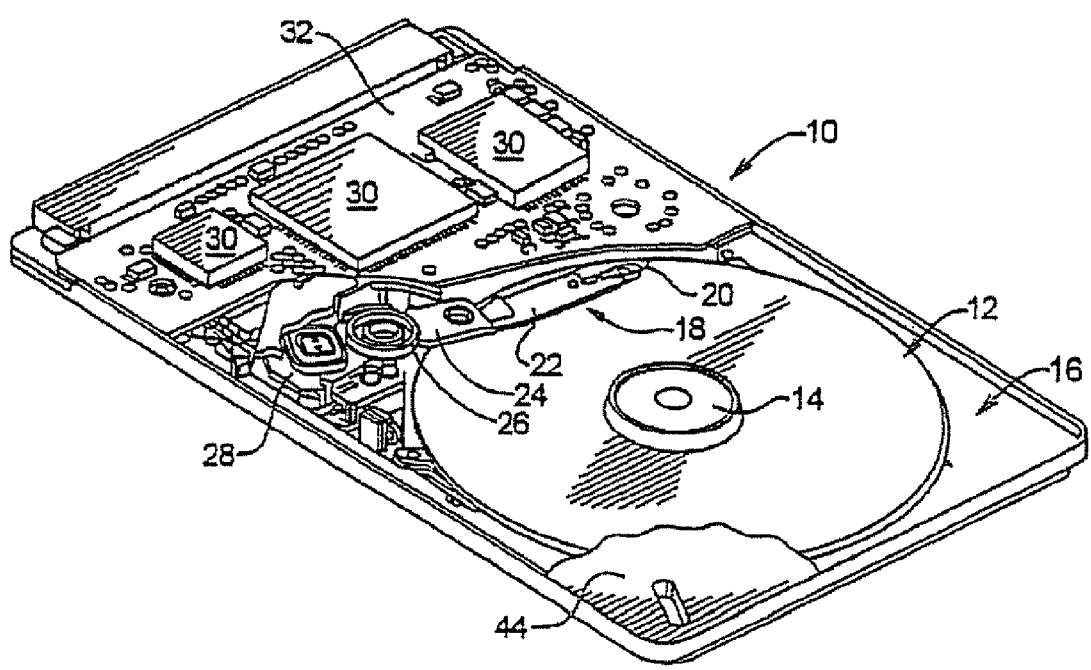
FIG. 1 is a perspective view of a disk drive in accordance with some embodiments.
Figure 2:
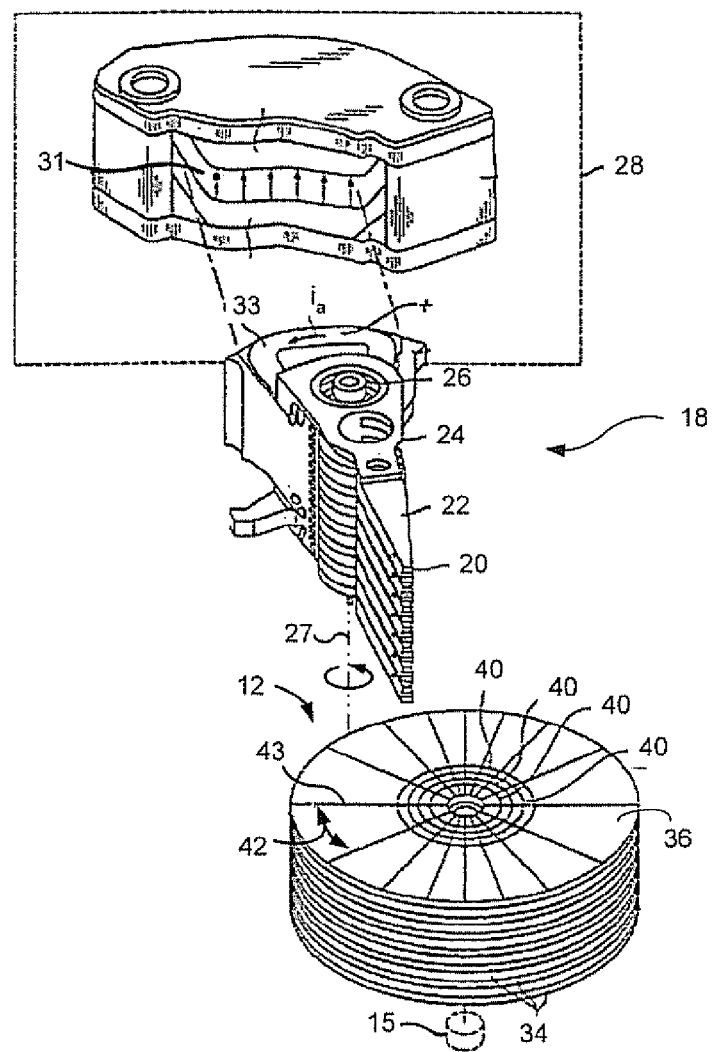
FIG. 2 is an exploded perspective diagram of a disk stack having a plurality of data storage disks along with an actuator assembly.

A simplified diagrammatic representation of a disk drive, generally designated as 10, is illustrated in FIG. 1. The disk drive 10 includes a disk stack 12 (illustrated as a single disk within a housing 44 in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, a voice coil motor (VCM) 28 includes a pair of fixed magnets that generate a magnetic field 31. The actuator arm assembly 18 is rotatably mounted on a spindle 26 and includes a VCM coil 33 at one end thereof. The VCM coil is positioned within the magnetic field 31 generated by the VCM 28. When an actuator current $i_a$ is passed through the VCM coil 33, a torque is generated on the actuator arm assembly 18, causing the actuator arm assembly 18 to rotate about an axis 27 corresponding to the spindle 26.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

The disk stack 12 typically includes a plurality of disks 34, each of which may have a pair of disk surfaces 36. The disks 34 are mounted on a cylindrical shaft and are rotated about an axis by the spindle motor 15. FIG. 2 further illustrates tracks 40 and spokes 43 on the disks 34. Data is stored on the disks 34 within a number of concentric tracks 40 (or cylinders). Each track 40 is divided into a plurality of sectors 42 separated by radially extending spokes 43. Each sector 42 is further divided into a servo sector and a data sector. The servo sectors of the disks 34 are used, among other things, to accurately position the head 20 so that data can be properly written onto and read from a selected one of the disks 34. The data sectors are where non-servo related data (i.e., host device data) is stored and retrieved.

Figure 3:
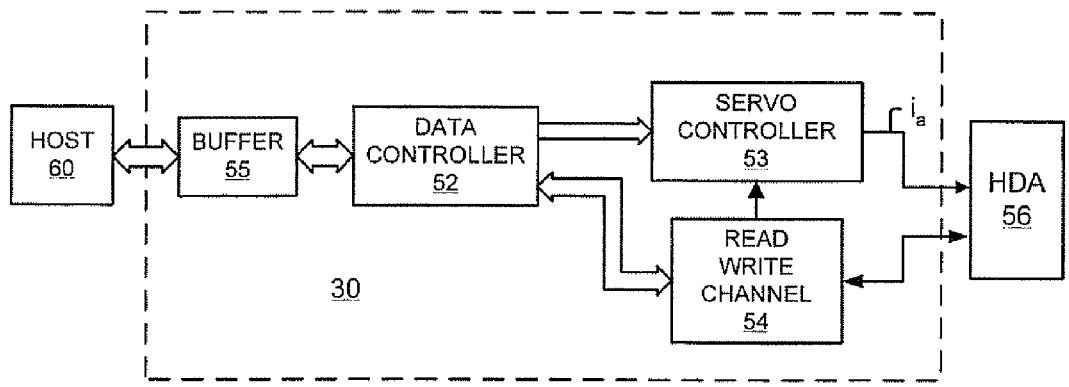
FIG. 3 is a block diagram of a portion of the controller of the disk drive shown in FIG. 1 and associated methods.

FIG. 3 is a block diagram illustrating a host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although the controllers 52, 53, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34, a plurality of the heads 20 mounted to the actuator arm assembly 18 and positioned adjacent to different data storage surfaces of the disks 34, the VCM 28, and the spindle motor 15.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the PDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34 by applying an actuator current signal $i_a$ to the VCM 28, and to maintain the head 20 aligned with the track while data is written/read on the disk 34.

To more accurately control the velocity of the flexure arms 22 and the heads 20 mounted thereon during a disk ramp load and/or unload process, it is desirable to monitor the velocity of the actuator arm 24. The Back-EMF voltage of the VCM coil 33 can provide a measure of the speed of the actuator arm 24. The Back-EMF voltage is a voltage that appears at the terminals of a coil when the coil is moved through an external magnetic field. The level of Back-EMF that appears at the terminals of the VCM coil 33 is directly related to the velocity of the VCM coil 33. Accordingly, Back-EMF can provide a measure of the velocity of the VCM coil 33, and, consequently, the velocity of the heads 20 mounted on the flexure arms 22.

Figure 4:
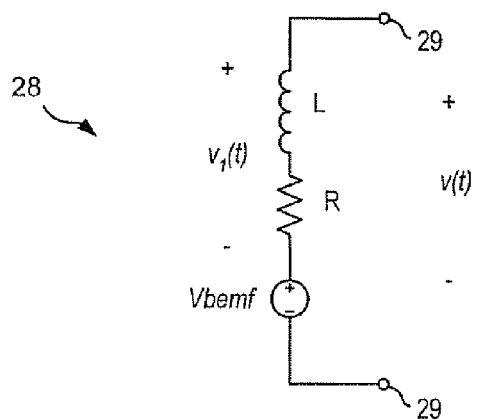
FIG. 4 is an equivalent circuit of a coil of a voice coil motor (VCM).

The Back-EMF is not the only voltage component that can appear at the terminals of a VCM coil 33. For example, if a current, such as an actuator current $i_a$ is flowing through the VCM coil 33, a voltage is induced across the VCM coil 33 due to the resistance and inductance of the coil VCM 33. FIG. 4 is a circuit diagram of a model of a VCM coil 33. The VCM coil 33 can be modeled as having a coil inductance L, a coil resistance R and a Back-EMF voltage Vbemf. The combined voltage of the inductance L, the resistance R and the Back-EMF Vbemf appears at the terminals 29 of the VCM coil 33. The voltage of the VCM coil 33 that results from current through the inductance L and resistance R of the VCM coil 33 is referred to herein as the "internal voltage" of the coil, and is denoted $v_1(t)$. The total voltage appearing at the terminals 29 of the VCM coil 33 is referred to herein as the "terminal voltage" of the VCM coil 33, and is denoted $v(t)$.

Thus, to measure the Back-EMF of the VCM coil 33, one method is to place the VCM 28 in a high-impedance (i.e., tri-state) mode in which the VCM coil 33 is substantially electrically isolated from the VCM driving circuitry in the servo controller 53, and wait for transient currents within the VCM coil 33 to decay to zero. After the transient currents in the VCM coil 33 have decayed to zero, the voltage difference appearing at the terminals of the VCM coil 33 can be measured. The resulting measurement is equal to the value of Back-EMF on the VCM coil 33 caused by the motion of the VCM coil 33 through the fixed magnetic field 31. The VCM 28 can then be switched back on, so that it can continue to be driven by actuator current from the servo controller 53.

However, it may take a relatively long time (e.g., several hundreds of micro-seconds) for the transient currents in the VCM coil 33 to decay to zero. Switching the VCM 28 off and on for Back-EMF measurement at a rate lower than 20 kHz can result in the generation of acoustic noise that can be heard by a user of the disk drive. Such noise can be annoying to users, and some users can incorrectly assume that the noise indicates a mechanical problem or design flaw in the disk drive.

To reduce these acoustic problems during ramp load and/or unload processes, the on-off switching frequency of the VCM current should be higher than 20 kHz. Accordingly, the time during which the VCM 28 is placed in the high impedance tri-state mode for measuring head velocity should be much less than 50 µs.

Some embodiments provide apparatus and/or methods that can predict the Back-EMF of a VCM coil 33 based on measurements of the terminal voltage (i.e. the voltage appearing at the terminals 29) of the VCM coil 33 during the tri-state mode before the end of the VCM current transient. That is, instead of waiting for the VCM current transients to decay to zero, some embodiments can extract the Back-EMF from the behavior of the VCM coil 33 when it enters the tri-state mode. After the measurement of Back-EMF, the VCM 28 can be switched back on. Thus, the time that the VCM 28 spends in the tri-state mode can be reduced significantly in some embodiments.

Figure 5:
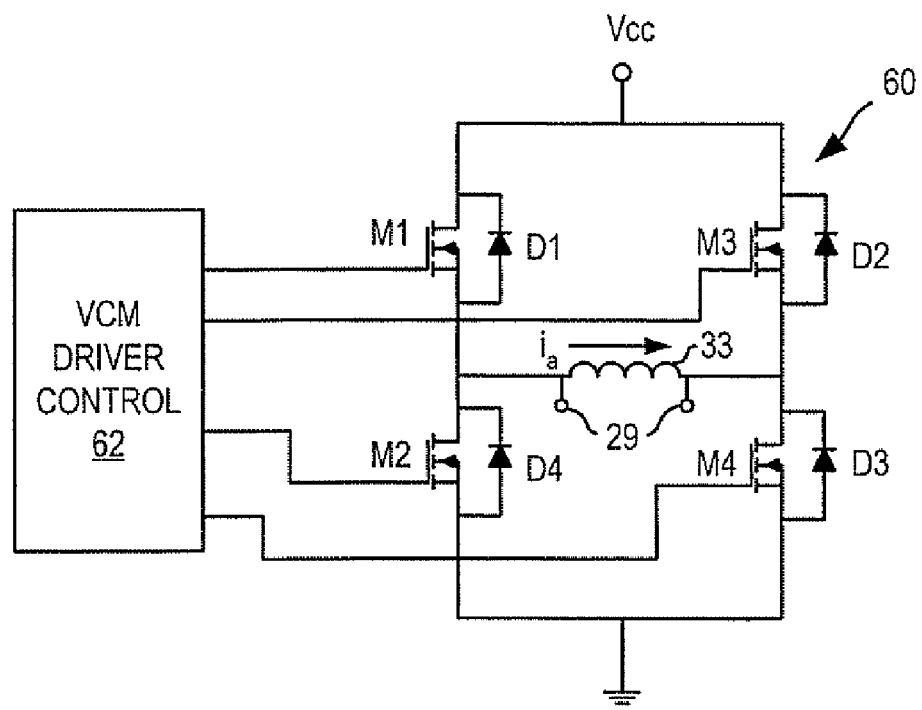
FIG. 5 is a circuit diagram of an H-bridge circuit for controlling a VCM coil according to some embodiments.

FIG. 5 illustrates a power stage driver circuit for a VCM 28 according to some embodiments. In particular, FIG. 5 illustrates a VCM coil 33 that is connected at the center of an H-bridge circuit 60 that includes transistors M1-M4 and power diodes D1-D4. Each of the transistors M1-M4 is driven by a control signal from a VCM driver control circuit 62, which may be part of the servo controller 53 (FIG. 3). Each of the diodes D1-D4 is connected in antiparallel with a respective transistor M1-M4. The H-bridge 60 is also connected to a supply voltage Vcc and a ground. Current is passed through the VCM coil in a desired direction by controlling the on/off status of the transistors M1-M4.

Figure 6:
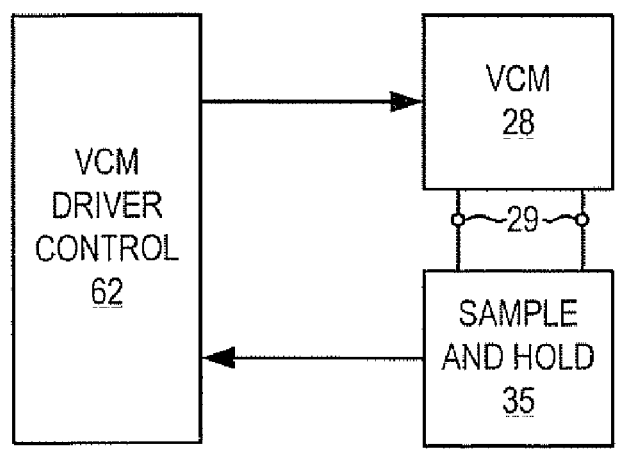
FIG. 6 is a block diagram illustrating VCM driver circuitry according to some embodiments.

Referring to FIG. 6, the VCM 28 can be connected to a sample and hold circuit 35 that is configured to measure the terminal voltage of the VCM coil 33 at the terminals 29 thereof. The construction and operation of sample and hold circuits is well known in the art. A typical sample and hold circuit includes a switched capacitor having a capacitance C. The voltage detected by the sample and hold circuit 35 is provided to the VCM driver control circuit 62.

Figure 7:
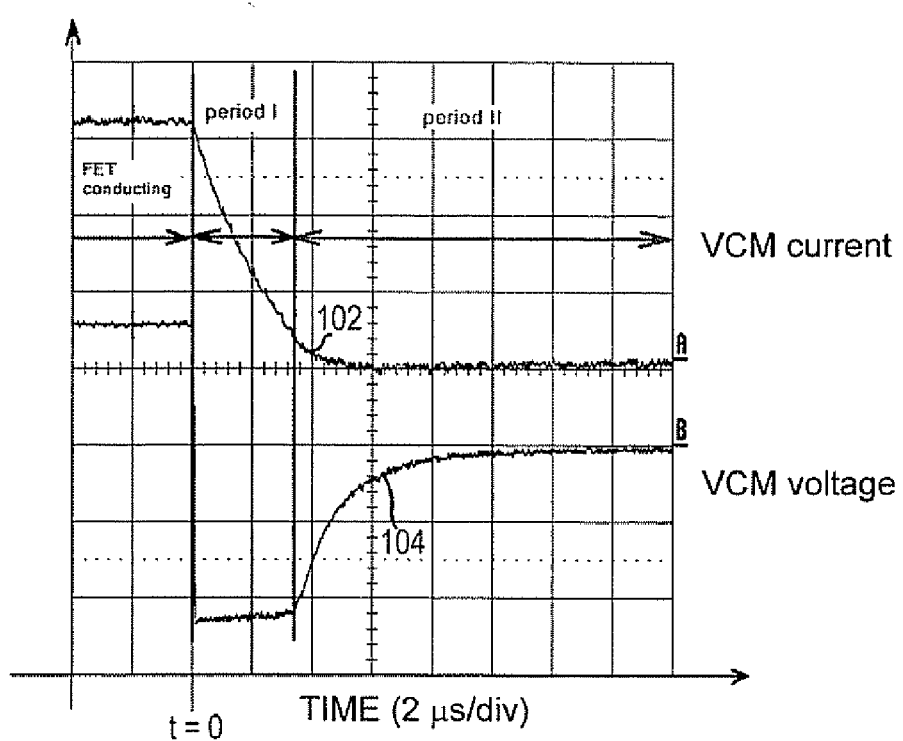
FIG. 7 is a graph illustrating transient voltage and current response of a VCM coil when the VCM coil is placed in a high impedance state.

If the VCM coil 33 that is moving through a magnetic field 31 has an initial current at the time it is switched to the high impedance tri-state, the VCM coil 33 will exhibit a current transient response as shown in FIG. 7 due to the configuration of the power stage H-bridge circuit 60. As shown in FIG. 7, the transient current response of the VCM coil 33 during the tri-state period includes two stages, illustrated in FIG. 7 as Period I and Period II. The current through the VCM coil 33 is shown as curve 102, while the terminal voltage of the VCM coil 33 is shown as curve 104.

Before time t=0, the VCM 28 is switched on, and is receiving relatively constant actuator current from the servo controller 53. The terminal voltage of the VCM coil 33 is positive and relatively constant. At time t=0, the VCM 28 is switched to high impedance tri-state mode. The current in the VCM coil 33 begins to decay (Period I). The negative slope of the current response results in a negative voltage appearing at the terminals 29 of the VCM 28.

During Period I, the voltage on the VCM coil 33 is primarily a result of the change of current through the inductance L of the VCM coil 33. In Period II, the terminal voltage (curve 104) of the VCM coil 33 starts to rise towards a steady state value that is equal to the Back-EMF voltage on the VCM coil 33. As can be seen in FIG. 7, it may take substantially more than 50 µs for the terminal voltage of the VCM coil 33 to settle at the level of the Back-EMF.

Some embodiments reduce the amount of time the VCM 28 is held in the tri-state mode by predicting the Back-EMF value of VCM coil 33 based on the transient current in the VCM coil 33. Afterwards, the VCM 28 can be switched on, reducing the amount of time the VCM 28 is held in the tri-state mode (i.e. increasing the switching frequency).

In the following discussion, t is the time at which the Back-EMF value is measured after switching to the tri-state mode, u is the voltage command which drives the current of VCM 28 before the tri-state mode is entered, i is the actual current passing through the VCM coil 33 and v(t) is the terminal voltage of the VCM coil 33, i.e. the voltage difference between the two terminals 29 of the VCM coil 33 at time t. As noted above, the terminal voltage of the VCM coil 33 can be expressed as the sum of the Back-EMF voltage and the internal voltage of the VCM coil 33 as follows:

$$v(t) = V_{bemf} + v_1(t) \tag{1}$$

where $V_{bemf}$ is the BACK-EMF value of the VCM coil 33 and the internal voltage $v_1(t)$ is given as:

$$v_1(t) = L\frac{di}{dt} + Ri \tag{2}$$

where L is the inductance and R is resistance of the VCM coil 33.

Thus, from Eq. (1), the Back-EMF of the VCM coil 33 can be expressed as:

$$V_{bemf} = v(t) - v_1(t) \tag{3}$$

Some embodiments provide methods that can predict the value of $v_1(t)$ during the tri-state Period II. Using the predicted value of $v_1(t)$, the value of the Back-EMF on the VCM coil 33 can be estimated.

Initially, the flexure arm 22 attached to the VCM 28 is biased against the crash-stop of the disk drive, so that the VCM coil 33 is not moving. Thus, the value of BACK-EMF is zero, i.e., $V_{bemf}=0$. From Eq. (1), the terminal voltage v(t) is therefore given as $v(t)=v_1(t)$. At this point, the applied voltage command will push the actuator arm against the crash-stop.

Before the VCM 28 is placed in the tri-state mode, the voltage command is u. Thus, the VCM current $i_0$ before the VCM enters tri-state mode is given as:

$$i_0 = \frac{u}{R} \tag{4}$$

The VCM 28 is then placed in tri-state mode while it is biased against the crash stop. Referring to FIG. 5, when the VCM 28 is placed into tri-state mode, the four transistors M1-M4 are switched off, and two of the power diodes (e.g., D2 and D4) are forward biased, depending on the direction of current flow in the VCM 28 before the beginning of the tri-state mode. Thus, the voltage applied to the terminals of the VCM 28 at the beginning of tri-state Period I can be expressed as:

$$v = -(V_{cc} + 2V_D) \tag{5}$$

where $V_D$ is the voltage drop of the power diodes D2 and D4 when both are forward biased. During the tri-state period I, the VCM current $i_1$ can be expressed as:

$$i_1(t) = i_0 e^{-\frac{R}{L}t} + \frac{v}{R}(1 - e^{-\frac{R}{L}t}), \text{ for } 0 < t < \text{Period } I \tag{6}$$

Combining Eqs. (4), (5) and (6) yields:

$$i_1(t) = \frac{u}{R}e^{-\frac{R}{L}t} - \frac{V_{cc} + 2V_D}{R}(1 - e^{-\frac{R}{L}t}) \tag{7}$$

By setting $i_1=0$, Eq. (7) shows that the VCM current decays to zero at time $t_1$, as follows:

$$t_1 = \frac{L}{R}\text{Ln}\left(1 + \frac{u}{V_{cc} + 2V_D}\right) \tag{8}$$

However, at this point of time, due to the electrical characteristics of the VCM power stage, including the VCM driver control circuit 62 and the sample and hold circuit 35, the VCM current is not stable. That is, the VCM current transient process has not finished, and the VCM 28 and enters into the tri-state Period II to completely attenuate the VCM current to zero as shown in FIG. 7.

Figure 8:
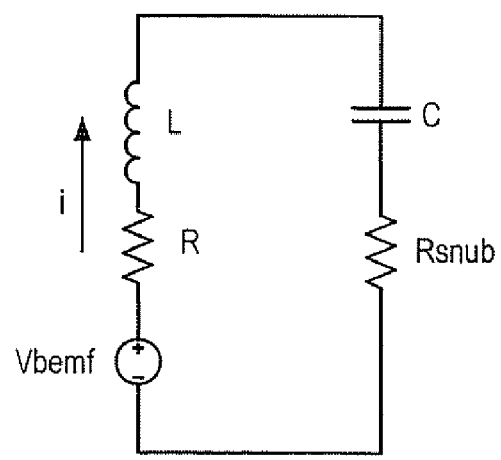
FIG. 8 is an equivalent circuit of a VCM coil when the VCM coil is placed in a high impedance state.

During tri-state Period II (shown in FIG. 7), the equivalent circuit of the power stage driver circuitry is shown in FIG. 8. As shown therein, the VCM 28 is connected during tri-state Period II to a circuit modeled by a capacitance C and a resistance $R_{snub}$.

In the following discussion, $u_c$ and $i_c$ refer to the voltage drop and current, respectively, of the capacitor C, C denotes the capacitance and $R_{snub}$ for additional resistance as shown in FIG. 8.

Accordingly, the following equation describes the voltage on the capacitor C:

$$LC\frac{d^2 u_c}{dt^2} + R'C\frac{du_c}{dt} + u_r = 0 \tag{9}$$

where $R'=R+R_{snub}$. With appropriate choices for the snubber capacitance and resistance, the following solution can be obtained for Eq. (9):

$$u_c(t') = k_1 e^{p_1 t} + k_2 e^{p_2 t} \tag{10}$$

where, $p_1$ and $p_2$ are the negative real roots of the following characteristic equation, $$LCS^2 + R'CS + 1 = 0 \tag{11}$$

The initial conditions for tri-state Period II are $$\begin{cases} u_c(t')|_{t=0} = V_{cc} + 2V_D \\ i_c(t')|_{t=0} = 0 \end{cases} \tag{12}$$

where t'=0 refers to the time at the end of period I and the start of tri-state period II. Moreover, the following coefficients are defined:

$$\begin{cases} k_1 = \dfrac{-(V_{cc}+2V_D)p_2}{p_1-p_2} \\ k_2 = \dfrac{(V_{cc}+2V_D)p_1}{p_1-p_2} \end{cases} \quad (13)$$

Thus the voltage drop across the VCM coil 33 during tri-state Period II can be expressed as:

$$v(t') = L\dfrac{di_c}{dt} + i_c(t')*R = \gamma_1 e^{p_1 i} + \gamma_2 e^{p_2 i} \quad (14)$$

where $\gamma_1$ and $\gamma_2$ are constant coefficients given as:

$$\begin{cases} \gamma_1 = RCk_1 p_1 + LCk_1 p_1^2 \\ \gamma_2 = RCk_2 p_2 + LCk_2 p_2^2 \end{cases} \quad (15)$$

If the voltage drop at is measured at time t since the beginning of tri-state Period I, then $$t' = t - t_1 \quad (16)$$

where $t_1$ can be obtained by Equation (8).

From Equations (8), (14) and (16), for a voltage command u before tri-state Period I, the terminal voltage v of the VCM coil 33 at time t after entry of tri-state mode can be obtained using the following equation:

$$v_1(t) = \beta_1(t)\left(1+\dfrac{u}{V_{cc}+2V_D}\right)^{-\tfrac{p_1 L}{R}} + \beta_2(t)\left(1+\dfrac{u}{V_{cc}+2V_D}\right)^{-\tfrac{p_2 L}{R}} \quad (17)$$

where $\beta_1(t)$ and $\beta_2(t)$ are constant coefficients for a fixed measurement time t, as follows:

$$\begin{cases} \beta_1(t) = \gamma_1 e^{p_1 t} \\ \beta_2(t) = \gamma_2 e^{p_2 t} \end{cases} \quad (18)$$

Expanding equation (17) yields:

$$v_1(t) = k_{r0} + k_{r1} u + k_{r2} u^2 + \ldots k_{ri} u^i + \ldots \quad (19)$$

where $k_{r0}, k_{r1}, k_{r2}, \ldots, k_{ri}, \ldots$ are constant coefficients for fixed measurement time t and satisfy $k_{r0} = \beta_1(t) + \beta_2(t)$ and $$k_{ri} = \beta_1(t)\dfrac{(-\tau_1)(-\tau_1-1)\ldots(-\tau_1-i+1)}{V_0^i} + \beta_2(t)\dfrac{(-\tau_2)(-\tau_2-1)\ldots(-\tau_2-i+1)}{V_0^i} \quad (20)$$

with $i = 1, 2, \ldots \infty$, $V_0 = V_{cc} + 2V_D$, $\tau_1 = \dfrac{p_1 L}{R}$ and $\tau_2 = \dfrac{p_2 L}{R}$.

Figure 9:
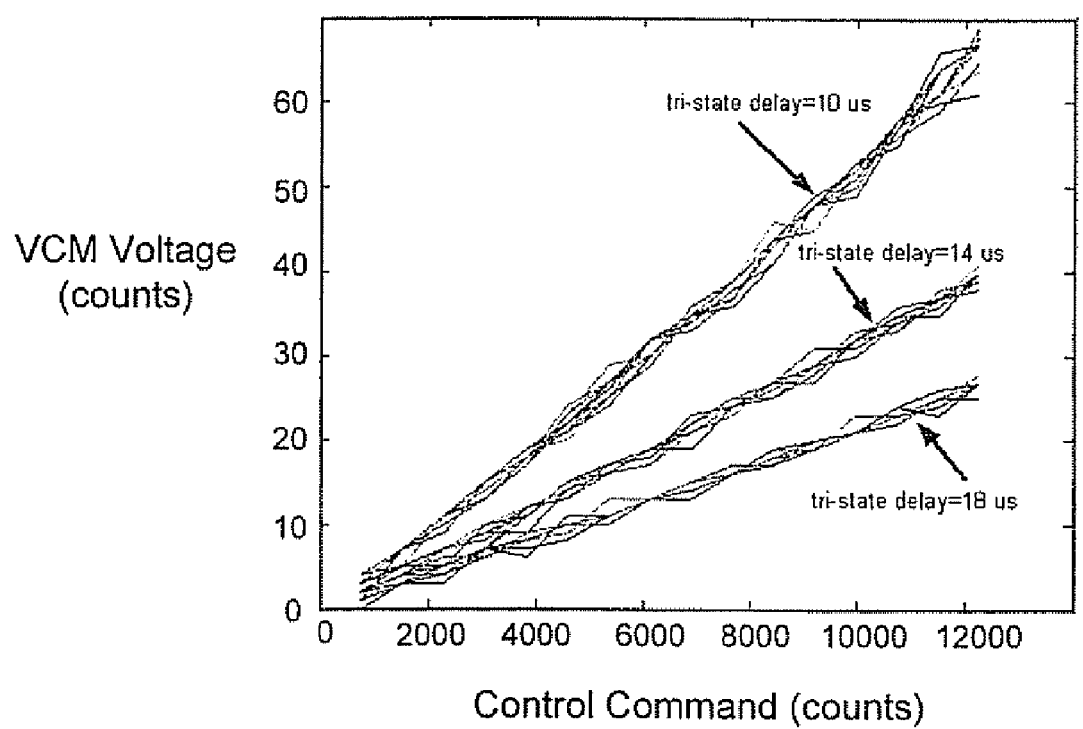
FIG. 9 is a graph of exemplary VCM voltage versus control command for various tri-state delays.

FIG. 9 is a graph of VCM voltage versus command at tri-state delay time t. The tri-state delay in FIG. 9 refers to the elapsed time t from the starting of the tri-state, i.e., the instant of t=0 in FIG. 7. Accordingly, for a given tri-state delay time, FIG. 9 illustrates an approximately linear relationship between the control command and the VCM voltage. FIG. 9 shows experimental results in which a first order approximation is used to predict the value of $v_1$ at time t during tri-state Period II, as follows:

$$v_1(t) = k_{r0} + k_{r1} u \quad (21)$$

If the VCM 28 is moving, then following a similar procedure as described above, the Back-EMF can be estimated as follows:

In tri-state Period I, the current will go to zero at time $t_2$, where:

$$t_2 = \dfrac{L}{R}\text{Ln}\left(\dfrac{u+V_{cc}+2V_D}{V_{cc}+2V_D+V_{bemf}}\right) \quad (22)$$

Corresponding to Eq. (17), at time t after tri-state, the voltage between VCM without Back-EMF is $$v_2(t) = \beta'_1(t)\left(\dfrac{u+V_{cc}+2V_D}{V_{cc}+2V_D+V_{bemf}}\right)^{-\tfrac{p_1 L}{R}} + \beta'_2(t)\left(\dfrac{u+V_{cc}+2V_D}{V_{cc}+2V_D+V_{bemf}}\right)^{-\tfrac{p_2 L}{R}} \quad (23)$$

The coefficients $\beta'_1(t) \approx \beta_1(t)$ and $\beta'_2(t) \approx \beta_2(t)$ based on $V_{cc}+2V_D \gg V_{bemf}$.

Further, since $V_{cc}+2V_D \gg V_{bemf}$, then from Eqs. (23) and (17), the following equation can be obtained:

$$v_2(t) \approx v_1(t) = \beta_1(t)\left(1+\dfrac{u}{V_{cc}+2V_D}\right)^{-\tfrac{p_1 L}{R}} + \beta_2(t)\left(1+\dfrac{u}{V_{cc}+2V_D}\right)^{-\tfrac{p_2 L}{R}} \quad (24)$$

Thus, when the actuator arm is moving, the voltage drop between the two ends of VCM coil is given as:

$$v(t) = v_2(t) + V_{bemf} \approx v_1(t) + V_{bemf} \quad (25)$$

Therefore, it is possible to predict the value of $v_1(t)$ using Eq. (19) when the flexure arm 22 is biased against the crash stop. The Back-EMF value can then be calculated using Eq. (3).

According to some embodiments, the flexure arm 22 is biased against the crash stop. The voltage command u is changed, and the voltage across the VCM coil at time t during tri-state period II is measured. This information is used to set up the predictor in Eq. (19). Then, when the tri-state mode is entered during movement of the VCM coil/flexure arm 22, the predictor is used to predict the value of $v_1(t)$ during tri-state Period II. This information can then be used to estimate the value of Back-EMF according to some embodiments.

Figure 10:
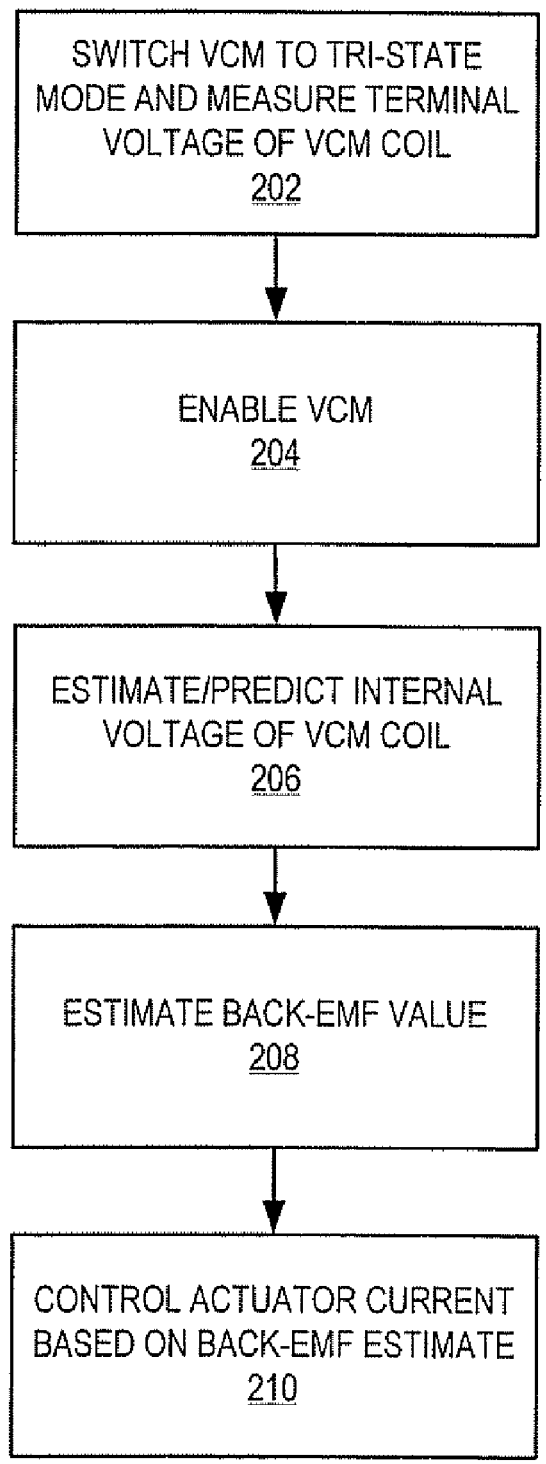
FIG. 10 is a flowchart illustrating systems/methods according to some embodiments.

Thus, during a load/unload process, the steps illustrated in FIG. 10 may be followed:

1. Switch the VCM 28 to tri-state mode and measure the terminal voltage v(t) between the two terminals of the VCM coil at time t during the tri-state Period II (Block 202);
2. Enable the VCM 28 again (Block 204);
3. Estimate/Predict the value of $v_1(t)$ using the Eq. (19) (Block 206);
4. Estimate the Back-EMF value $V_{bemf}$ using Equation (3) at time t during tri-state period II (Block 208);
5. Based on the estimated Back-EMF value, update the control signals applied to the VCM coil to adjust the speed of the heads 20 (Block 210);

The foregoing steps can be repeated until the speed of the heads 20 is within a desired range.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method, comprising:
   measuring a terminal voltage of an actuator motor while the actuator motor is in a high impedance state;
   estimating an internal voltage of the actuator motor;
   estimating a back-EMF voltage of the actuator motor in response to the terminal voltage of the actuator motor and the internal voltage of the actuator motor;
   switching the actuator motor from the high impedance state to an ON state after measuring the terminal voltage and before current in the actuator motor has decayed to zero; and
   controlling a drive current supplied to the actuator motor in response to the estimated back-EMF.

2. The method of claim 1, wherein the actuator motor is switched between the high impedance state and the ON state at a frequency that is greater than 20 kHz.

3. The method of claim 1, wherein controlling the drive current supplied to the actuator motor comprises controlling the drive current of the actuator motor during a disk ramp load process to thereby control a speed of a transducer on an actuator arm driven by the actuator motor relative to a data storage disk.

4. The method of claim 1, wherein the actuator motor is driven by an H-bridge comprising a plurality of transistors, and wherein switching the actuator motor to a high impedance state comprises switching the plurality of transistors to an OFF state.

5. A method, comprising:
   measuring a terminal voltage of an actuator motor while the actuator motor is in a high impedance state;
   estimating an internal voltage of the actuator motor;
   estimating a back-EMF voltage of the actuator motor in response to the terminal voltage of the actuator motor and the internal voltage of the actuator motor; and
   controlling a drive current supplied to the actuator motor in response to the estimated back-EMF;
   wherein estimating the internal voltage of the actuator motor comprises estimating the internal voltage of the actuator motor in response to a parameter of the actuator motor measured while an actuator arm driven by the actuator motor is retained in a non-moving position.

6. The method of claim 5, wherein the parameter comprises a current through the actuator motor measured in response to a voltage command u applied to the actuator motor.

7. The method of claim 6, wherein estimating the internal voltage of the actuator motor comprises estimating the internal voltage of the actuator motor according to the equation $$v_1(t) = k_{r0} + k_{r1}u + k_{r2}u^2 + \ldots k_{ri}u^i + \ldots$$

where $k_{r0}, k_{r1}, k_{r2}, \ldots, k_{ri}, \ldots$ are constant coefficients for a fixed measurement time t.

8. An apparatus, comprising:
   a driver circuit that switches an actuator motor between a high impedance state and an ON state;
   a sample and hold circuit that is coupled to terminals of the actuator motor and that measures a terminal voltage of the actuator motor while the actuator motor is in the high impedance state; and
   a control circuit that receives the measured terminal voltage of the actuator motor from the sample and hold circuit, estimates an internal voltage of the actuator motor, estimates a back-EME voltage of the actuator motor in response to the terminal voltage of the actuator motor and the internal voltage of the actuator motor, and controls a drive current supplied to the actuator motor in response to the estimated back-EMF;
   wherein the driver circuit switches the actuator motor from the high impedance state to the ON state after the sample and hold circuit measures the terminal voltage and before current in the actuator motor has decayed to zero.

9. The apparatus of claim 8, wherein the driver circuit switches the actuator motor between the high impedance state and the ON state at a frequency greater than 20 kHz.

10. The apparatus of claim 8, wherein the control circuit controls the drive current supplied to the actuator motor during a disk ramp load process to thereby control a speed of a transducer on an actuator arm driven by the actuator motor relative to a data storage disk.

11. The apparatus of claim 8, further comprising an H-bridge that drives the actuator motor, the H-bridge comprising a plurality of transistors.

12. The apparatus of claim 11, wherein the driver circuit switches the actuator motor to a high impedance state by switching the plurality of transistors to an OFF state.

13. An apparatus, comprising:
   a driver circuit that switches an actuator motor between a high impedance state and an ON state;
   a sample and hold circuit that is coupled to terminals of the actuator motor and that measures a terminal voltage of the actuator motor while the actuator motor is in the high impedance state; and
   a control circuit that receives the measured terminal voltage of the actuator motor from the sample and hold circuit, estimates an internal voltage of the actuator motor, estimates a back-EMF voltage of the actuator motor in response to the terminal voltage of the actuator motor and the internal voltage of the actuator motor, and controls a drive current supplied to the actuator motor in response to the estimated back-EMF;
   wherein the control circuit biases an actuator arm driven by the actuator motor to retain the actuator arm in a non-moving position and estimates the internal voltage of the actuator motor in response to a parameter of the actuator motor measured while the actuator arm is biased in the non-moving position.

14. The apparatus of claim 13, wherein the parameter comprises a current through the actuator motor measured in response to a voltage command u applied to the actuator motor.

15. The apparatus of claim 14, wherein the control circuit estimates the internal voltage of the actuator motor according to the equation $$v_1(t) = k_{r0} + k_{r1}u + k_{r2}u^2 + \ldots k_{ri}u^i + \ldots$$

where $k_{r0}, k_{r1}, k_{r2}, \ldots, k_{ri}, \ldots$ are constant coefficients for a fixed measurement time t.

16. A circuit, comprising:
   a control circuit that receives a measured terminal voltage of an actuator motor while the actuator motor is in a high impedance state, estimates an internal voltage of the actuator motor, estimates a back-EMF voltage of the actuator motor in response to the terminal voltage of the actuator motor and the internal voltage of the actuator motor, and controls a drive current supplied to the actuator motor in response to the estimated back-EMF;

wherein the control circuit biases an actuator arm driven by the actuator motor in a non-moving position and estimates the internal voltage of the actuator motor in response to a parameter of the actuator motor measured while the actuator arm is biased in the non-moving position.

17. The circuit of claim 16, wherein the control circuit estimates the internal voltage of the actuator motor according to the equation $$v_1(t) = k_{r0} + k_{r1}u + k_{r2}u^2 + \ldots k_{ri}u^i + \ldots$$

where u is a voltage command, and $k_{r0}, k_{r1}, k_{r2}, \ldots k_{ri}, \ldots$ are constant coefficients for a fixed measurement time t.

* * * * *